United States Patent
Ouji et al.

(10) Patent No.: US 9,691,174 B2
(45) Date of Patent: Jun. 27, 2017

(54) AUTOMATED AORTA DETECTION IN A CTA VOLUME

(71) Applicant: AGFA HEALTHCARE, Mortsel (BE)

(72) Inventors: Asma Ouji, Mortsel (BE); Koen Vergote, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 37 days.

(21) Appl. No.: 14/892,086

(22) PCT Filed: May 26, 2014

(86) PCT No.: PCT/EP2014/060823
§ 371 (c)(1),
(2) Date: Nov. 18, 2015

(87) PCT Pub. No.: WO2014/195170
PCT Pub. Date: Dec. 11, 2014

(65) Prior Publication Data
US 2016/0093096 A1    Mar. 31, 2016

(30) Foreign Application Priority Data

Jun. 5, 2013 (EP) .................... 13170543

(51) Int. Cl.
| | | |
|---|---|---|
| *G06K 9/00* | (2006.01) |
| *G06T 15/08* | (2011.01) |
| *G06K 9/46* | (2006.01) |
| *G06K 9/62* | (2006.01) |
| *G06T 5/50* | (2006.01) |
| *G06T 7/11* | (2017.01) |
| *G06T 7/187* | (2017.01) |
| *G06T 7/136* | (2017.01) |

(52) U.S. Cl.
CPC ............ *G06T 15/08* (2013.01); *G06K 9/4604* (2013.01); *G06K 9/6218* (2013.01); *G06T 5/50* (2013.01); *G06T 7/11* (2017.01); *G06T 7/136* (2017.01); *G06T 7/187* (2017.01); *G06T 2207/10081* (2013.01); *G06T 2207/30008* (2013.01); *G06T 2207/30101* (2013.01)

(58) Field of Classification Search
None
See application file for complete search history.

(56) References Cited

U.S. PATENT DOCUMENTS

| | | | | |
|---|---|---|---|---|
| 7,953,262 B2 * | 5/2011 | Suryanarayanan | .. G06K 9/4638 | 382/128 |
| 2004/0101183 A1 * | 5/2004 | Mullick | ............ G06T 5/50 | 382/131 |

(Continued)

FOREIGN PATENT DOCUMENTS

EP    2 051 205 A1    4/2009

OTHER PUBLICATIONS

Official Communication issued in International Patent Application No. PCT/EP2014/060823, mailed on Jun. 27, 2014.
(Continued)

*Primary Examiner* — Hadi Akhavannik
(74) *Attorney, Agent, or Firm* — Keating and Bennett, LLP

(57) ABSTRACT

A method for detecting main body vessels (e.g., the aorta) in a medical volume includes refining the result of a bone removal algorithm.

13 Claims, 4 Drawing Sheets

Input 3D volume    Bone removal result    Aorta detection result

(56) References Cited

U.S. PATENT DOCUMENTS

| | | |
|---|---|---|
| 2005/0113679 A1* | 5/2005 | Suryanarayanan ..... G06T 7/187 600/425 |
| 2005/0195189 A1 | 9/2005 | Raman et al. |
| 2006/0122501 A1* | 6/2006 | Lara-Montalvo .. A61B 5/02007 600/425 |
| 2008/0118127 A1 | 5/2008 | Sirohey et al. |
| 2008/0188962 A1 | 8/2008 | Suryanarayanan et al. |

OTHER PUBLICATIONS

Hahn et al., "A Minimally-Interatctive Watershed Algorithm Designed for Efficient CTA Bone Removal", CVAMIA 2006, LNCS 4241, 12 pages.

Kirbas et al., "A Review of Vessel Extraction Techniques and Algorithms", Jan. 2003, 52 pages [retrieved on Jul. 21, 2006]. Retrieved from the Internet <URL: ftp://cmp.felk.cvut.cz/pub/cmp/articles/matas/ps/Curvilinear/blood-vessel_review.pdf>.

* cited by examiner

AUTOMATED AORTA DETECTION IN A CTA VOLUME

CROSS-REFERENCE TO RELATED APPLICATIONS

This application is a 371 National Stage Application of PCT/EP2014/060823, filed May 26, 2014. This application claims the benefit of European Application No. 13170543.6, filed Jun. 5, 2013, which is incorporated by reference herein in its entirety.

BACKGROUND OF THE INVENTION

1. Field of the Invention

The present invention relates to a computer-implemented method of automated vessel detection in medical images, such as computed tomography angiography (CTA) images.

2. Description of the Related Art

In a radiocontrast medical imaging setting, a patient is administered a contrast agent to increase the radiodensity of some lumen in the body. In a reconstruction of angiographic X-ray projections, the vessel tree will therefore have a density similar to that of bony tissue. As such, when displaying only high intensity voxels of the volume, the radiologist is presented with an image containing only the vessel tree and bone. As bone might visually obstruct certain parts of the vessel tree, a significant speed-up of the diagnosis can be achieved by removing the skeletal structures from the view. This task can be broken up in a segmentation, and a classification task. During segmentation, the image data is broken up into regions that contain image elements likely to be of the same type (i.e. bone or vessel). Based on some quantitative or qualitative features of the regions, a classification scheme or user then determines if a particular region should be considered osseous or vascular tissue.

Bone removal algorithms do not allow to detect the vessel structure in a perfect way. There are always some fragments that need to be cleaned up.

SUMMARY OF THE INVENTION

Preferred embodiments of this invention provide a method to detect the vessel structure in a volume image, such as a CTA image in an optimal way.

The above-mentioned preferred embodiments are achieved by the methods set out below. Specific features for preferred embodiments of the invention are also set out below.

The present invention is applicable to a 2D image represented by a digital pixel representation as well as to a 3D volume represented by a voxel representation. When 2D image is mentioned it is understood to be interchangeable with a 3D volume and vice versa.

The present invention can be implemented as a computer program product adapted to carry out all aspects of the method of the present invention when run on a computer. The invention also comprises a computer readable medium comprising computer executable program code adapted to carry out the steps of the method of the present invention.

Further advantages and embodiments of the present invention will become apparent from the following description.

DETAILED DESCRIPTION OF THE PREFERRED EMBODIMENTS

In this detailed description the methods of the present invention are explained with regard to the detection of the aorta in a computed tomography angiography image (CTA image). CTA volume density is expressed in Hounsfield units.

The aorta is the largest artery in the body, originating from the left ventricle of the heart and extending down to the abdomen, where it bifurcates into two smaller arteries.

Hence, considering an abdominal CT scanner generated volume, the aorta corresponds to the largest component in the vessel tree.

Although preferred embodiments of the invention have been designed for the detection of the aorta in a CTA volume, it will be clear that the methods can also be used for other applications.

For example, if the X-ray reconstructed image is not an abdominal image, a method of the invention can be applied to detect the largest vessel instead of for detecting the aorta.

Other applications are the refinement of the bone removal results getting an appropriate input for tracking the vessels to detect vascular diseases, etc.

The proposed methods encompass two major segmentation steps: Bone removal and Aorta detection.

Figure 1:
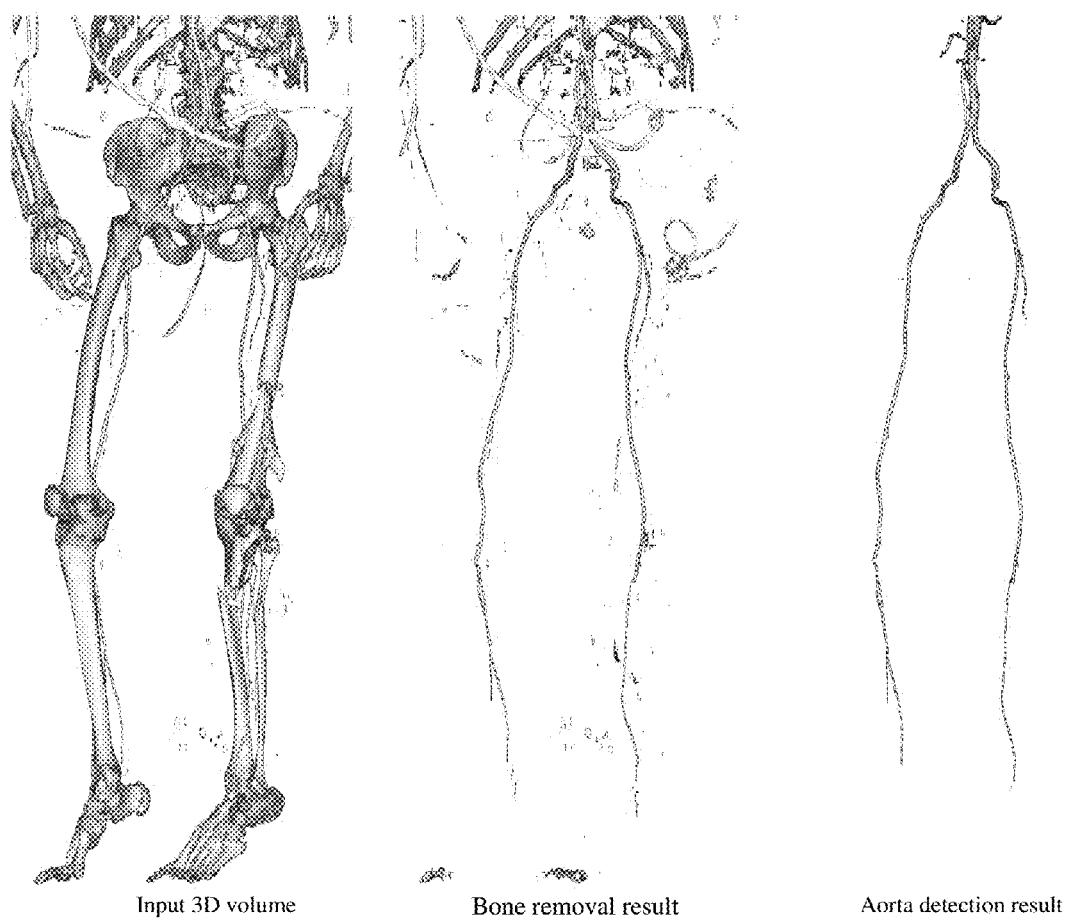
FIG. 1 shows the input 3D volume, the result of the bone removal algorithm applied to this input 3D volume and the result of the aorta detection algorithm.
Figure 2:
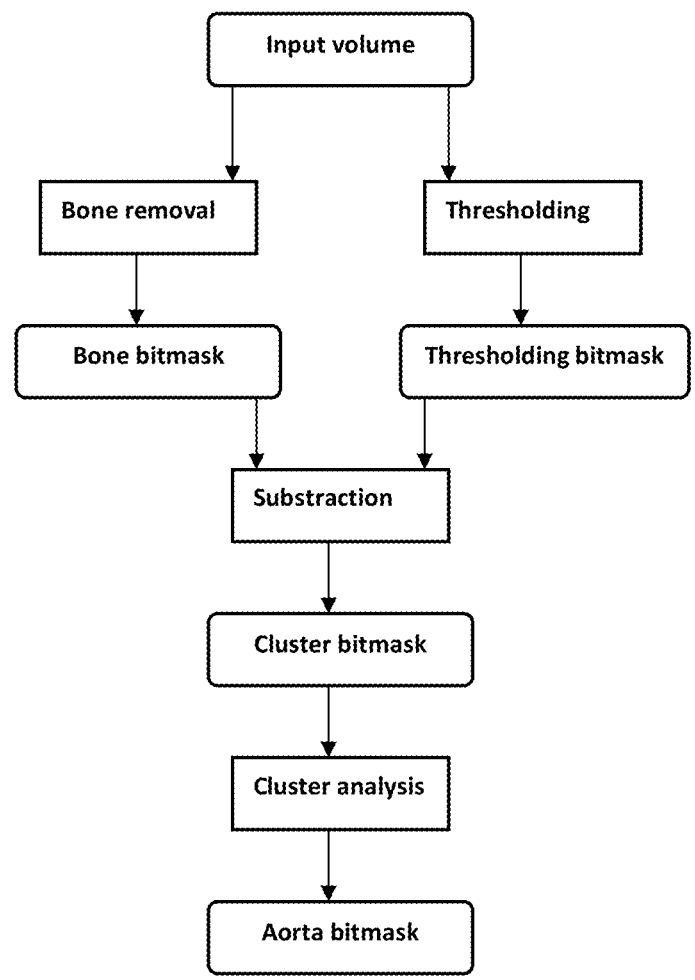
FIG. 2 is a flow chart illustrating the different steps of a preferred embodiment of the present invention.

The overall algorithm is illustrated in FIG. 2.

Figure 3:
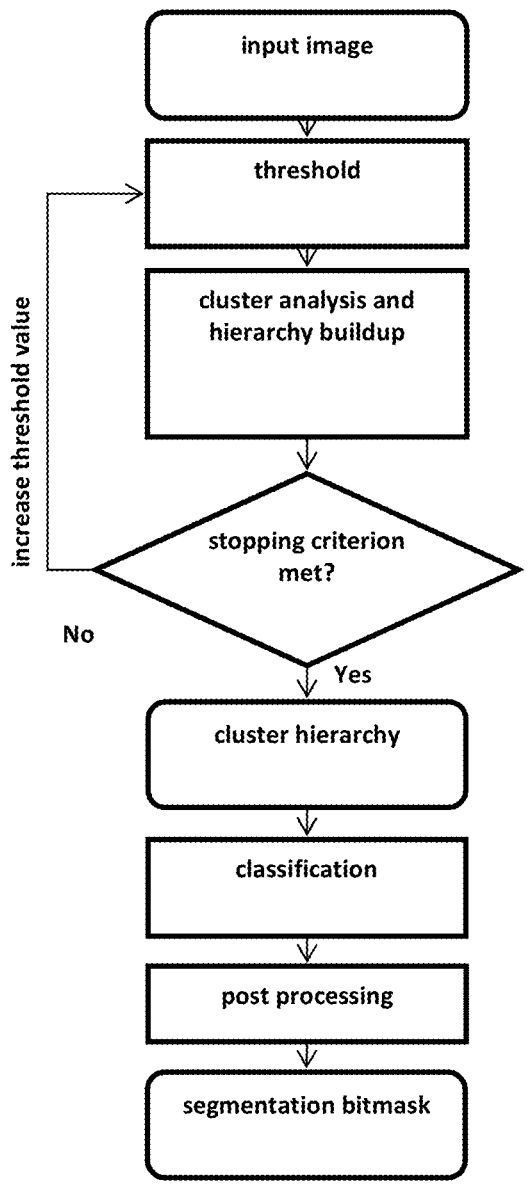
FIG. 3 is a flow chart illustrating the bone segmentation.

The bone removal steps are illustrated in FIG. 3.

Bone Removal

Bone removal methods are known in the art and include, for example, interactively controlled thresholding methods such as described in "Semiautomatic bone removal technique from CT angiography data". Med Imaging, Proc. SPIE 4322 (2001) 1273-1283 (by Alyassin, A. M., Avinash, G. B.). Other methods are based on the watershed technique such as described in "Improved watershed transform for medical image segmentation using prior information", IEEE Trans Med Imaging 23(4) (2004) 447-458 (by Grau, V., Mewes, A. U. J., Alcaniz, M., Kikinis, R., Warfield, S. K.). An example of region growing based bone removal is the one proposed by M. Fiebich: "Automatic bone segmentation technique for CT angiographic studies", J. Comput As, vol. 23, no. 1, p. 155, 1999.

Taking into consideration the computational complexity of thresholding methods in general with respect to that of watershed based methods, and the relative ease at which they can be parallelized, a threshold based segmenter is preferred in the context of the present invention.

A watershed based segmenting algorithm (illustrated in FIG. 3) as described below is preferably used in a method of the present invention.

A method in general comprises a segmentation stage and a classifying step.

The segmentation stage consists of an iterative process of thresholding and cluster analysis.

Iterative Thresholding:

The threshold operations are performed iteratively, with increasing threshold value each time: the mask of voxels that remain after each threshold operation is fed into the new threshold operation, at each stage reducing the computational cost as the number of voxels decreases. The masks rendered by each of the threshold operations are analyzed to find clusters of adjacent voxels. During this analysis, a number of qualitative features is calculated for each cluster.

A method of the present invention starts with an initial threshold operation at 180 Hounsfield units. The output is a binary mask in which only the voxels with intensity higher than 180 HU are set to 1. Due to the sparsity of this mask, it is stored in memory as a run-length encoded mask. This first mask forms the input to the iterative process of cluster analysis and thresholding:

Cluster Analysis:

Clusters are defined as a group of voxels in which each voxel is adjacent to at least one of the other voxels in the group. At this stage adjacency is defined in the 6-neighborhood sense, but the cluster generator can be configured to use e.g. a 26-neighborhood of voxels.

Clusters are created by labelling runs in the run-length encoded mask. A run is labelled using an integer label and this label is propagated to all of its adjacent runs. This is achieved in a forward sweep followed by a pruning operation in which previously established corresponding labels are replaced by one unique label. One cluster is generated for each unique label in the mask. During analysis both intensity based features, such as variance, maximum value, average value, histogram data, and morphological features, such as volume, compactness, center of gravity, porosity, and principal components can be computed for each cluster. A cluster is therefore characterised by a combination of an integer label and a series of features computed on the voxels of runs carrying that label.

To reduce the number of clusters that need to be stored clusters smaller than 500 mm$^3$ are removed from the run-length mask before it is passed to the next threshold operation. The parameter that controls the increase of the threshold value between consecutive thresholds is in the described example set to 20 HU. By using the previous mask as input to the next threshold operation, the number of voxels that need to be visited during the threshold operation is reduced to the number of voxels in the mask.

The process of cluster generation and thresholding is continued until no clusters meet the minimum size requirement of 500 m$^3$ any more, or until a threshold level of 700 HU is reached. The algorithm can be configured to omit the minimum size requirement. This allows the cluster analysis step to be performed after the iterative thresholding.

Cluster Hierarchy:

Since in the present described embodiment thresholding is performed with a monotonically increasing threshold value, clusters will fall apart into smaller clusters. This is exactly the envisioned effect to provide segmentation between bone and vascular regions. To trace these break-up events in the mask, relations need to be established between the clusters computed at successive threshold levels. The tracing of the break-up events allows assigning classes to clusters and propagating these to lower threshold clusters until a break-up event marks the joining of two distinct classes. Relationships between a higher and a lower threshold value mask are established by linking all clusters of the mask with the higher threshold value to the ones in the mask with a lower threshold value. For each cluster a direct 'ancestor' is established by taking an arbitrary voxel position of the cluster and looking up the label corresponding to this position in the lower threshold value mask. Each ancestor cluster maintains a list of its 'successor' clusters and each successor retains its direct ancestor.

Establishing hierarchy also enables to compute differential features describing the evolution of cluster features with respect to changing threshold levels.

Figure 4:
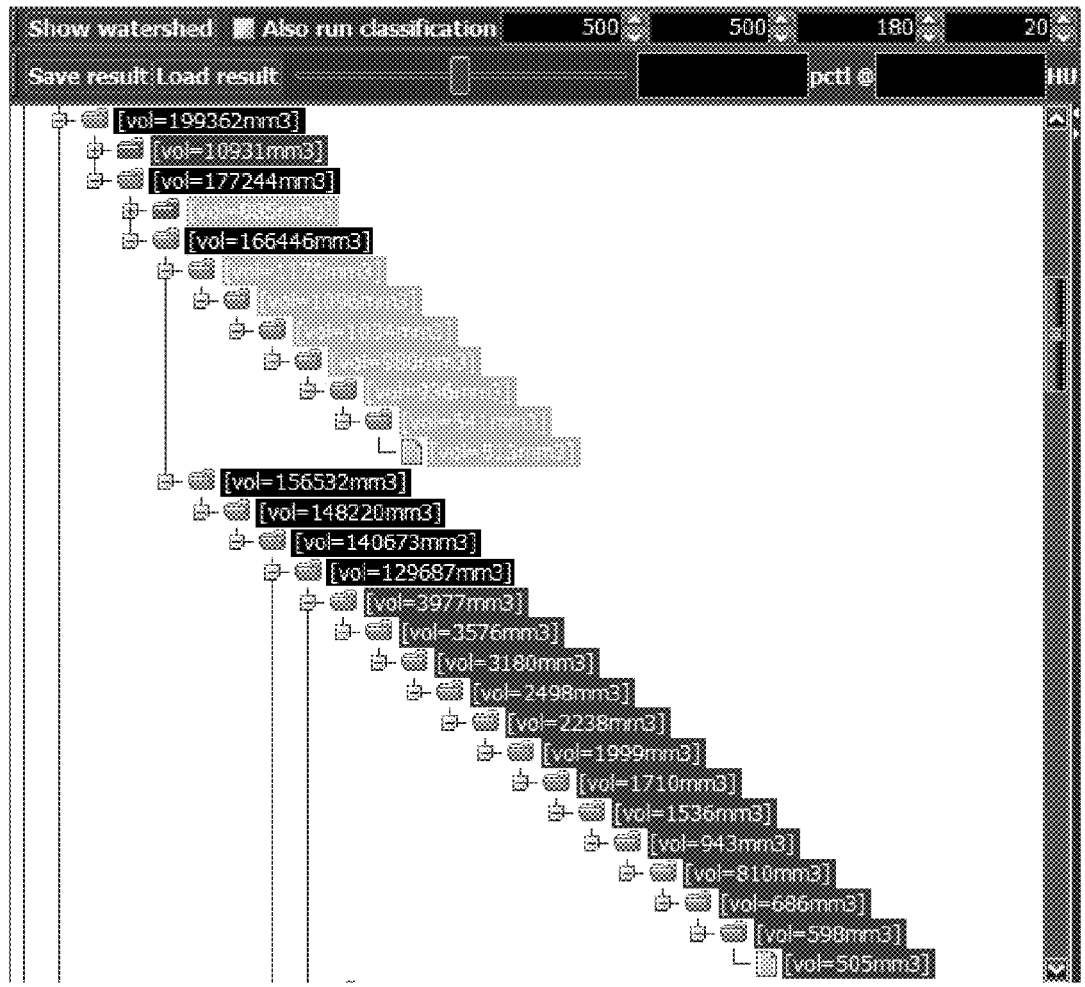
FIG. 4 shows a classified hierarchical breakdown of part of a volume.

Building the cluster hierarchy can also be performed incrementally as part of the cluster analysis step, as depicted in FIG. 4.

Classifier

To determine whether a computed cluster is part of osseous or vascular tissue the algorithm needs to be able to differentiate between these cluster classes based on their features. A learning algorithm can be used to train such a classifier based on manually labelled training data.

Classification

As mentioned earlier, some clusters are classified directly whereas others are assigned a class through propagation. Clusters are only classified directly if they have no successors any more. All other clusters in the hierarchy are ancestors of these 'leaves' and will be assigned a class based on propagation rules:

If all the successors of the cluster are of the same class, that cluster receives the same classification as its successors.

In all other cases the cluster receives the 'mixed' class attribute.

The highest clusters in the hierarchy (i.e. those generated on the lowest threshold level) that did not receive the mixed classification are the 'top ancestral clusters'.

The class propagation scheme is implemented recursively, ensuring clusters are visited only once during classification.

Each cluster also contains accumulators to keep track of the number of leafs each class has among its successors. This allows to, optionally, use a voting system: a direct classification of a leaf cluster can be overruled if there are sufficient indications that the direct classification was erroneous. As an example, consider a vessel tree in which one of the bifurcations is calcified. A calcification cluster has a higher probability of being misclassified since their characteristics are widely diverse and, as such, their features can be hard to discriminate of those of osseous clusters. Such single misclassification in a vessel tree is likely to be corrected by a voting mechanism that overrules a 10 to 1 minority.

The combination of the used segmentation and classification scheme yields several advantages with respect to watershed methods. Not only is the number of items that need to be classified several orders of magnitude smaller (typically $5.10^5$ versus 150 for a 512×512×770 dataset), which is good for performance reasons, but since the clusters typically have a larger extent and have a larger volume, the computed features are more robust to noise and down sampling the volume by reducing the number of slices. The described implementation is configured to down sample the volume on which the algorithm is performed, to slices with a minimal thickness of 2 mm.

The process of iterative thresholding in combination with a classifier trained to classify only the leaves of the cluster hierarchy also effectively solves the problem of the overlapping density values of trabecular bone and vessel tissue. Since the trabecular bone is typically first thresholded away, leaving only cortical bone, the classifier is never forced to label low density leaves as bone.

Training

The classifier used by the algorithm is a decision tree trained on a manually labelled training set of leaf clusters coming from a mixture of CT-scanners. The data was labelled by generating and visualizing the cluster hierarchy for each dataset. Selecting a cluster from the hierarchy would highlight the corresponding voxels in the CT scan.

The selected cluster and all of its successors would then be labeled as a certain class by keystroke.

The labeled data is then fed into a learning algorithm that generates a decision tree using cross validation. To maintain generality the learner is forced to have at least 6 training instances per generated classifier leaf.

The learner is configured to discern the valuable from the useless cluster features and selects only the valuable features to train on. The cluster features the classifier is trained on are both features computed during the segmentation stage (cluster average, variance, maximum and skewness), and a differential feature named 'minimum relative volume' (MRV). The MRV of a cluster is the minimum of the volume ratios encountered when tracing from its root ancestral cluster to itself. In which the volume ratio is defined as the ratio between the volume of the direct ancestor, and the sum of the volumes of its direct successors. Calcifications and vascular clusters typically have a very low MRV, due to a sudden volume reduction above a certain threshold. The volumes of osseous clusters typically reduce much more slowly with respect to increasing threshold values, typically resulting in MRV values in the range 0.75 and 0.90.

Post-Processing

The output of the present described embodiment of the method of the present invention so far consists of 26 run-length encoded masks (each corresponding to a threshold level) and a hierarchy of linked and classified clusters. A preliminary bone mask can be found by merging all the osseous 'top ancestral clusters'. A top ancestral cluster is a non-mixed class cluster at the highest possible level of the hierarchy. As such, top ancestral clusters are always located at the threshold level of a break-up event.

Since voxels are lost from the mask at each threshold operation, the top clusters do not include all voxels. These lost voxels can be added to the bone mask again by some form of post processing. The algorithm can be configured to use two methods: morphological dilation or distance transform-based assignment. During distance transform-based assignment, voxels present in the initial threshold mask, but not in the preliminary bone or vessel mask are assigned to a cluster based on their distance to the nearest bone or vascular cluster. The class of the voxel is determined by looking up the distance of the voxel to the bone mask and to the vessel mask. The voxel is assigned to the class with whom the distance is smallest. This is achieved by generating two distance transforms of the initial threshold mask using the vessel, and bone masks respectively as source volumes.

Aorta Detection

The resulting first binary mask, either with or without the post-processing being applied is used in the next steps.

The original voxel representation of the medical image is subjected to a low-thresholding operation so as to yield a second binary mask.

In a preferred embodiment the low threshold is set at 156 HU (Hounsfield units) because it has been experimentally determined that this value leads to very good results. However this value can be set to a different value by the user by applying a window/leveling operation to the volume data.

Next, first and second binary masks are pixel-wise subtracted and in this way yield a third binary mask. This third mask forms the input to the process of cluster analysis.

Cluster Analysis:

Clusters are computed using a connected component extraction process similar to the one used in the bone removal step to build the watershed tree. A cluster is defined as a group of voxels in which each voxel is adjacent to at least one of the other voxels in the group. At this stage adjacency is defined in the 6-neighborhood sense, but the cluster generator can be configured to use e.g. a 26-neighborhood of voxels.

Clusters are created by labelling runs in the run-length encoded mask. A run is labelled using an integer label and this label is propagated to all of its adjacent runs. This is achieved in a forward sweep followed by a pruning operation in which previously established corresponding labels are replaced by one unique label. One cluster is generated for each unique label in the mask.

Analysis is based on a set features that be computed for each cluster. A cluster is therefore characterised by a combination of an integer label and a series of features computed on the voxels of runs carrying that label.

Examples of such features are the number of voxels within the cluster and the shape of the cluster.

Aorta Selection

Next, the largest connected components, being the connected components with the largest number of voxels, are upheld and constitute the vessel to be selected.

Other components are considered as not part of the vessel and can be removed.

The invention claimed is:

1. A method for detecting a main vessel in a volume represented by a digital voxel representation, the method comprising the steps of:
    applying a segmentation algorithm to the volume to create a first binary mask with one of a first class value and a second class value assigned to each voxel of the volume;
    applying a thresholding operation to the volume to obtain a second binary mask;
    subtracting the second binary mask from the first binary mask to generate a third binary mask;
    extracting from the third binary mask connected components by propagating labels to all adjacent voxels of the volume;
    computing features for each of the connected components; and
    preserving the connected components based on results of the step of computing features, and designating a preserved connected component as the vessel.

2. The method according to claim 1, wherein the step of applying the segmentation algorithm includes the steps of:
    subjecting the digital voxel representation to an iterative thresholding operation until a stopping criterion is reached;
    finding clusters of the adjacent voxels of the volume by analyzing results of each of the iterative thresholding operations;
    building a hierarchical representation of the volume by establishing relations between clusters found in the results of each of the iterative thresholding operations;
    assigning a type class to a leaf cluster of the hierarchical representation;
    propagating the type class towards a top of the hierarchical representation using propagation rules; and
    generating a marking mask to mark locations of voxels of a specific class by merging the locations of voxels contained in clusters that received that type class through the step of propagating.

3. The method according to claim 1, wherein the first class values are assigned to voxels of osseous tissue and the second class values are assigned to voxels of vascular tissue.

4. The method according to claim 1, wherein the volume is obtained by a computed tomography angiography procedure and the vessel is the aorta.

5. The method according to claim 1, wherein the features are at least one of a number of voxels in the connected component and a shape of the connected component.

6. The method according to claim 2, wherein the marking mask marks the locations of voxels that were contained in top ancestral clusters.

7. The method according to claim 2, wherein the stopping criterion is met when no clusters are generated that fulfill a minimum size requirement.

8. The method according to claim 2, wherein the stopping criterion is reached when a threshold is below a given limit value.

9. The method according to claim 2, wherein a class to be assigned to one of the clusters of the adjacent voxels of the volume is determined based on results of an analysis of values of qualitative and/or quantitative features determined for the one of the clusters.

10. The method according to claim 2, wherein a class to be assigned to a leaf is decided upon by a trained classifier.

11. The method according to claim 2, further comprising performing a first type of post processing including adding voxels to the marking mask to restore voxels lost during the iterative thresholding operation.

12. The method according to claim 11, wherein the first type of post processing includes a distance transform-based assignment process.

13. A non-transitory computer readable medium comprising a computer executable program code adapted to carry out the steps of claim 1 when the computer executable program code is executed on a computer.

* * * * *